(12) United States Patent
de Jong

(10) Patent No.: US 8,752,189 B2
(45) Date of Patent: Jun. 10, 2014

(54) RESOURCE MANAGEMENT SYSTEM AND CORRESPONDING METHOD

(75) Inventor: Hans de Jong, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/488,170

(22) Filed: Jun. 4, 2012

(65) Prior Publication Data

US 2012/0331559 A1 Dec. 27, 2012

(30) Foreign Application Priority Data

Jun. 27, 2011 (EP) .................................... 11171516
Oct. 5, 2011 (EP) .................................... 11183931

(51) Int. Cl.
*G06F 7/04* (2006.01)
*G06F 17/30* (2006.01)
*G06F 21/00* (2013.01)

(52) U.S. Cl.
USPC ............... 726/26; 705/57; 380/201; 726/28; 726/29; 726/30; 726/32

(58) Field of Classification Search
None
See application file for complete search history.

(56) References Cited

U.S. PATENT DOCUMENTS

| | | | |
|---|---|---|---|
| 7,716,745 B2 * | 5/2010 | Peinado | 726/26 |
| 2004/0167859 A1 * | 8/2004 | Mirabella | 705/59 |
| 2005/0192907 A1 * | 9/2005 | Blinn et al. | 705/59 |

FOREIGN PATENT DOCUMENTS

| | | |
|---|---|---|
| EP | 1 630 998 A1 | 3/2006 |
| EP | 1 748 343 A1 | 1/2007 |

OTHER PUBLICATIONS

Extended European Search Report for Patent Appln. No. 11183931.2 (Nov. 28, 2012).

* cited by examiner

*Primary Examiner* — Cordelia Zecher
*Assistant Examiner* — Trang Doan

(57) ABSTRACT

The invention provides a secure and efficient resource management system and a corresponding method for managing resources of a product that is put on the market by a licensor via a distribution chain. In particular, the number of keys needed for managing said resources can be reduced. At the time that the product is released to the market the exact licensing conditions of the product need not be known yet. The licensing conditions and the associated configuration of resources of the product are managed via a second key which is provided to a licensee. The licensee, however, has no knowledge of the first key and the derivation function which generates said second key based on the first key. Therefore, it is ensured that the licensee cannot claim more resources of the product than the licensor allows.

9 Claims, 3 Drawing Sheets

RESOURCE MANAGEMENT SYSTEM AND CORRESPONDING METHOD

CROSS-REFERENCE TO RELATED APPLICATIONS

This application claims the priority under 35 U.S.C. §119 of European patent application no. 11171516.5, filed on Jun. 27, 2011, and European patent application no. 11183931.2, filed on Oct. 5, 2011, the contents of which are incorporated by reference herein.

FIELD OF THE INVENTION

The invention relates to a resource management system for managing configurable resources of a product. The invention also relates to a method for managing configurable resources of a product.

BACKGROUND OF THE INVENTION

In the last decade the technical field of smart cards has gained a lot of importance. Smart cards can provide identification, authentication, data storage and application processing functions in many different application areas.

The benefits of smart cards depend on the volume of information and applications that are programmed for use on the cards. A single contact bound or contactless smart card can be programmed with multiple banking credentials, medical entitlement data, driver's license or public transport entitlement data, loyalty programs and club memberships, for example. Multi-factor and proximity authentication can be embedded into smart cards in order to increase the security of the services offered by the cards. For example, a smart card can be programmed to allow a contactless transaction only if it is within the range of another device, such as a uniquely paired mobile phone. This can significantly increase the security of the smart cards.

A more recent development is the concept of so-called Virtual Cards. For example, the applicant has marketed the Mifare Plus technology which features a so-called Virtual Card architecture. Basically, the Virtual Card architecture enables the configuration of a secure element, or a physical smart card, in accordance with a license that grants a right to use a particular set of resources offered by the smart card. In other words, the license specifies which set or subset of functions of the smart card can be used. Thus, the license can be used to configure the resources of the smart card. A Virtual Card is defined as a smart card on which specific licensed functionality has been enabled.

A secure element is typically sold through a distribution chain in which several parties are involved. For example, a secure element is made by a chip manufacturer who is also a licensor. The secure element is put on the market by the licensor. The secure element is arranged to comprise multiple Virtual Cards of the kind set forth. The Virtual Cards are managed by another party, such as a Trusted Service Manager (TSM), who acts as a licensee. Conventionally, one or more Trusted Service Managers receive keys for the Virtual Cards that need to be created on the secure element. Typically, a plurality of keys is needed to manage the creation of Virtual Cards on the secure element or, in other words, to configure the resources of the secure element after it has been put on the market.

SUMMARY OF THE INVENTION

It is an object of the invention to provide a secure and efficient resource management system and a corresponding method for managing resources of a product that is put on the market via a distribution chain of the kind set forth. In particular, it is an object of the invention to reduce the number of keys needed for managing said resources. This is achieved by a system as defined by claim 1 and by a method as defined by claim 11.

According to an aspect of the inventive resource management system, the resource management system comprises a licensor, a licensee and a product, wherein: the licensor is arranged to store a first key in the product and to transmit a license to the licensee; the licensor is further arranged to generate a second key by applying a derivation function to the license using the first key; the licensor is further arranged to transmit the second key to the licensee; the licensee is arranged to generate a configuration request comprising the license and license usage instructions; the licensee is further arranged to apply a protection function to at least a part of the configuration request using the second key; the licensee is further arranged to transmit the configuration request to the product; the product is arranged to generate a validation key by applying said derivation function to the license using the first key; the product is further arranged to validate the received configuration request by applying said protection function to the at least a part of the configuration request using the validation key and by comparing the result thereof with the result of the protection function applied by the licensee.

At the time that the product is released to the market the exact licensing conditions of the product need not be known yet. The licensing conditions and the associated configuration of resources of the product are managed via the second key which is provided to the licensee.

The licensee, however, has no knowledge of the first key and the derivation function. Therefore, it is ensured that the licensee cannot claim more resources of the product than the licensor allows.

According to another aspect of the inventive resource management system, the product is further arranged to configure its resources in accordance with the license usage instructions only if the compared results are the same.

According to a further aspect of the inventive resource management system, the license and the license usage instructions comprise a bytestring.

According to a further aspect of the inventive resource management system, the configuration request comprises optional other information.

According to a further aspect of the inventive resource management system, the protection function applied by the licensee and the product comprises the generation of a Message Authentication Code computed over the license and the license usage instructions using the second key and the validation key, respectively.

According to a further aspect of the inventive resource management system, the protection function applied by the licensee comprises a symmetric encryption algorithm applied to the license and license usage instruction using the second key, and the protection function applied by the product comprises a corresponding decryption algorithm using the validation key.

According to a further aspect of the inventive resource management system, the licensee is further arranged to transmit the configuration request to the product via a service operator; the service operator is arranged to append a keyset to the configuration request; and the product is further arranged to grant access to its resources only if the configuration request comprises said keyset.

According to a further aspect of the inventive resource management system, the product is further arranged to generate said keyset and to transmit said keyset to the service operator.

According to a further aspect of the inventive resource management system, the product is a secure element.

According to a further aspect of the inventive resource management system, the resource management system further comprises a handset manufacturer for embedding the secure element in a mobile device and a mobile network operator for putting the mobile device on the market.

Finally, according to an aspect of the inventive method for managing resources of a product in a resource management system comprising a licensor, a licensee and the product, the method comprises: the licensor stores a first key in the product and transmits a license to the licensee; the licensor further generates a second key by applying a derivation function to the license using the first key; the licensor further transmits the second key to the licensee; the licensee generates a configuration request comprising the license and license usage instructions; the licensee applies a protection function to at least a part of the configuration request using the second key; the licensee further transmits the configuration request to the product; the product generates a validation key by applying said derivation function to the license using the first key; the product further validates the received configuration request by applying said protection function to the at least a part of the configuration request using the validation key and by comparing the result thereof with the result of the protection function applied by the licensee.

BRIEF DESCRIPTION OF THE DRAWINGS

The invention will be described in more detail with reference to the appended drawings, in which.

DESCRIPTION OF PREFERRED EMBODIMENTS

Figure 1:
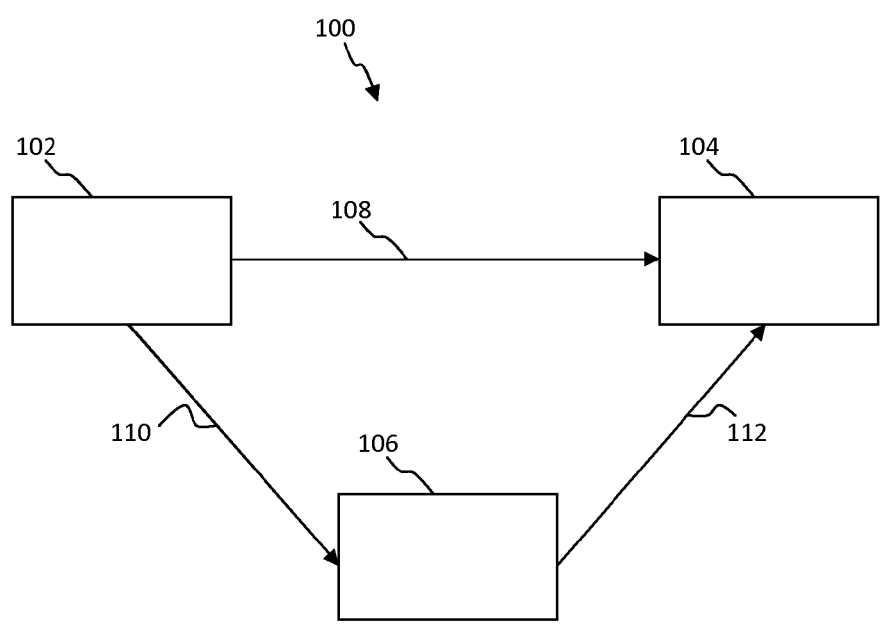
FIG. 1 shows a first embodiment of a resource management system according to the invention.

FIG. 1 shows a first embodiment 100 of a resource management system according to the invention. The resource management system 100 comprises a licensor 102 which communicates via a first communication channel 108 with a product 104. Typically, the licensor 102 is a chip manufacturer and the product 104 is a secure element produced by the chip manufacturer. In that case, the first communication channel 108 may consist of means to store information in said product 104 during manufacturing, for example. The licensor 102 communicates to the licensee 106 via a second communication channel 110, preferably a secure channel. The licensee 106 communicates via a third communication channel 112 with the product 104. Typically, the licensee 106 is a Trusted Service Manager (TSM).

In operation, the licensor 102 (or a party acting on behalf of the licensor) stores a first key in the product 104. The first key is referred to as resource management key and is denoted by K1. The licensor 102 transmits a license, which is denoted by L and comprises, for example, a bytestring, to the licensee 106. The licensor 102 further generates a second key (referred to as the wholesale key and denoted by K2) by applying a derivation function to the license using the resource management key. The derivation function is denoted by D, so the wholesale key is generated as follows: K2=D(K1). The licensor 102 further transmits the wholesale key to the licensee 106.

The licensee 106, in turn, generates a configuration request, which is a message that comprises the license and also instructions for configuring the resources of the product in a desired way. These instructions are referred to as license usage instructions and are denoted by LU. The way in which and the extent to which the resources can be configured is determined by the license. Furthermore, the licensee 106 applies a protection function to at least a part of the configuration request using the wholesale key.

For example, the configuration request may take the form of a message M1=L||LU||OOI||MAC(K2, L||LU||OOI), where OOI denotes optional other information and MAC denotes a specific example of a protection function, namely the generation of a Message Authentication Code computed over the license, the license usage instructions and the optional other information, using the wholesale key.

Alternatively, the protection function may comprise a symmetric encryption algorithm applied to the license and license usage instruction, again using the wholesale key. The licensee 106 further transmits the configuration request to the product 104.

The product 104, in turn, generates a validation key (denoted by VK) by applying said derivation function D to the license L using the resource management key K1. Thus, VK=D(K1). Note that the product knows the derivation function D and the resource management key K1, because they have both been inserted by the licensor 102 into the product 104 before it is released to the market, for example.

At the time that the product 104 is released to the market the exact licensing conditions need not be known yet. The licensing conditions and the associated configuration of resources of the product 104 are managed via the wholesale key K2 which is provided to the licensee 106 after the product 104 has been released to the market. The licensee 106, however, has no knowledge of the resource management key K1 and the derivation function D. Thereby, it is ensured that the licensee 106 cannot claim more resources of the product 104 than the licensor 102 allows.

However, once the product 104 is on the market, it will receive configuration requests from licensees, and it needs an efficient way to validate these requests. In particular, the product 104 needs to be able to verify whether a license L provided by a particular licensee 106 has been modified on the way between the licensor 102 and the product 104. Since, at that moment, the product 104 is physically detached from the licensor 102, it needs to perform this validation independently.

The present invention provides for an efficient validation of the configuration request. The product 104 validates the received configuration request by applying said protection function to the at least a part of the configuration request using the validation key and by comparing the result thereof with the result of the protection function applied by the licensee 106.

For example, the product computes the code MAC(VK, L||LU||OOI) and compares this code with the code MAC(K2, L||LU||OOI). Note that the latter code forms part of the configuration request M1 which the product 104 has received from the licensee 106. If the codes are the same, the result of the validation is positive and the product 104 configures its resources in accordance with the license usage instructions LU embedded in the configuration request M1.

Alternatively, as explained above, the licensee 106 may have applied a symmetric encryption algorithm to the license L and license usage instruction LU using the wholesale key K2. So, for example, the configuration request may take the form of a message M1=ENC(K2, L∥LU∥OOI), wherein OOI denotes optional other information and ENC denotes the symmetric encryption algorithm. In this case, the product 104 decrypts the configuration request by means of the corresponding decryption algorithm using the validation key VK, so by applying the function DEC(VK, L∥LU∥OOI). The integrity of the license and the configuration request is now protected by the encryption/decryption of the license and the license usage instructions. If the decryption succeeds, the results of the protection functions applied by the licensee 106 and by the product 104 are deemed to be the same, and the product 104 configures its resources in accordance with the license usage instructions LU.

Figure 2:
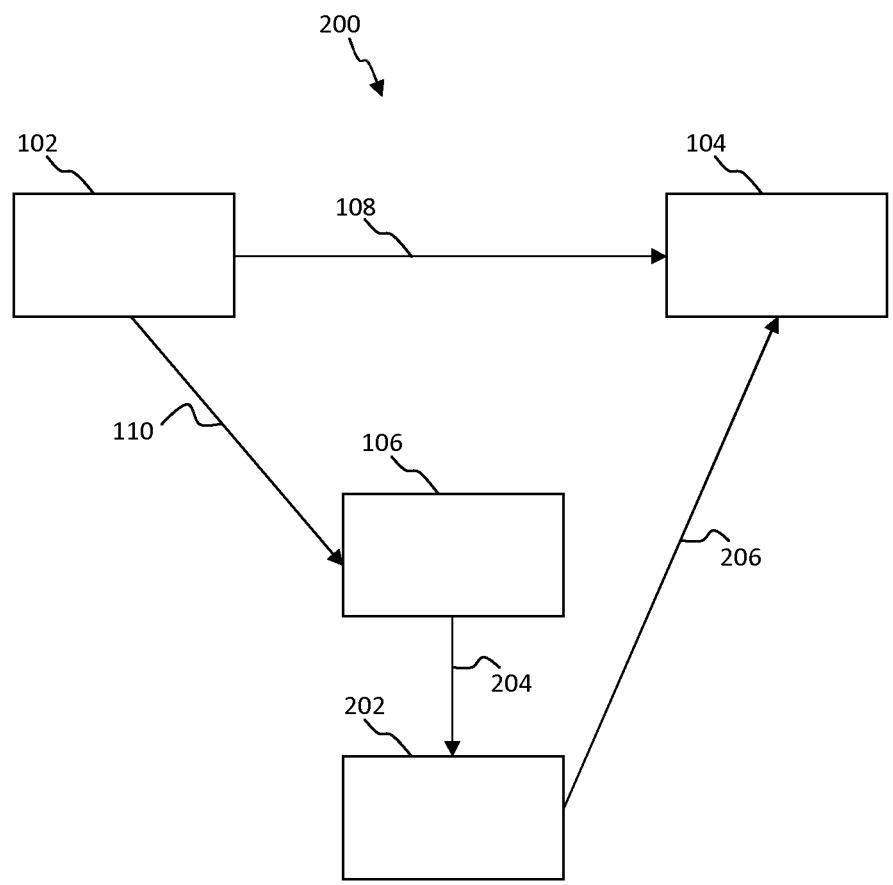
FIG. 2 shows a second embodiment of a resource management system according to the invention.

FIG. 2 shows a second embodiment 200 of a resource management system according to the invention. In this embodiment, the licensee 106 is further arranged to transmit the configuration request to the product 104 via a service operator 202. First, the licensee 106 is arranged to transmit the configuration request to the service operator 202 through a fourth communication channel 204. The service operator 202 is arranged to append a keyset K3 to the configuration request resulting in M1∥K3. The product 104 is further arranged to grant access to its resources only if the configuration request comprises said keyset K3. This system is more secure in the sense that only parties that know the keyset K3 can validly request configuration of the resources of the product 104. The licensee 106 has no direct access to the product 104, but it needs the service operator 202 to transmit the configuration request.

In order to further improve the security of the system, the product 104 may further be arranged to generate said keyset K3 and to transmit said keyset to the service operator 202. The service operator 202 is then arranged to use the keyset K3 in the above described way.

Figure 3:
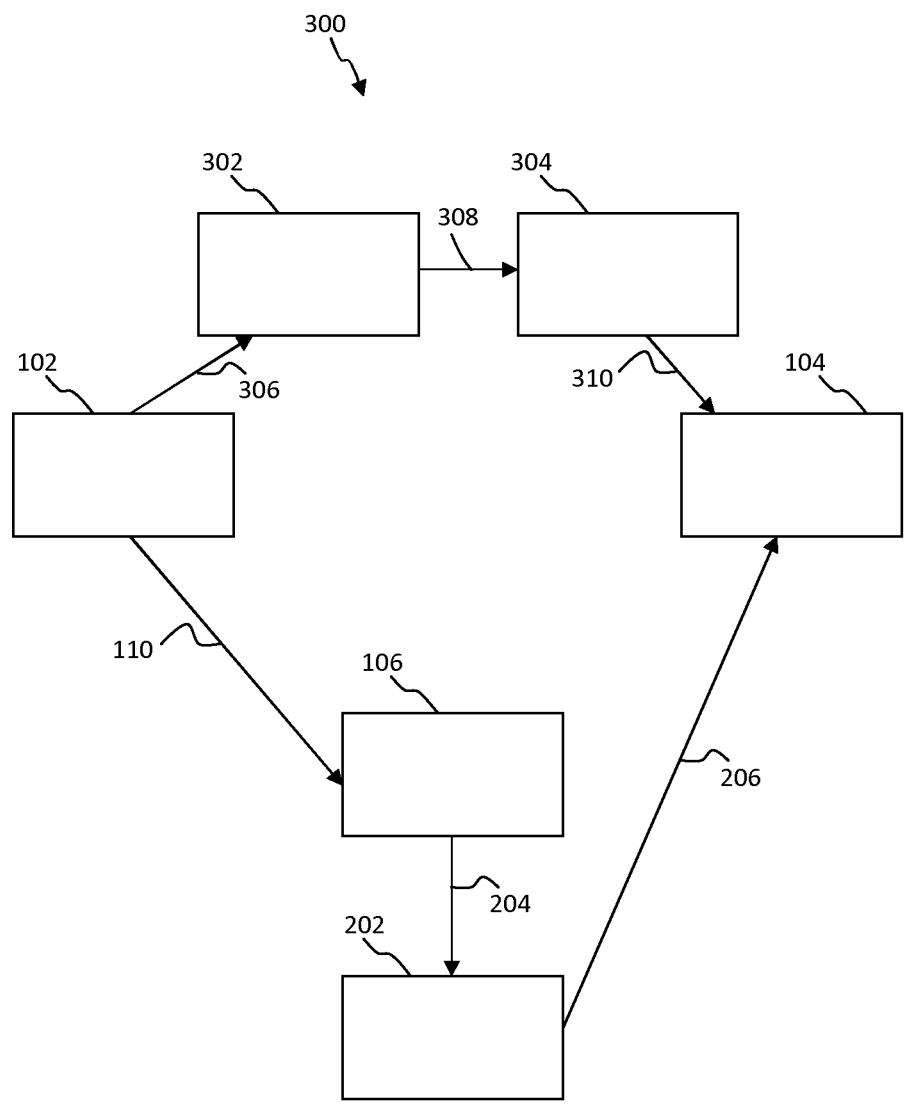
FIG. 3 shows a third embodiment of a resource management system according to the invention.

FIG. 3 shows a third embodiment 300 of a resource management system according to the invention. In this embodiment, the product 104 is a secure element and the system further comprises a handset manufacturer 302 for embedding the secure element in a mobile device, and a mobile network operator 304 for putting the mobile device on the market. This embodiment fits into a typical business model, in which the secure element is a component of an end-product that is put on the market by intermediate parties. The product 104 becomes physically detached from the licensor 102 and needs to perform the validation of any request for configuring its resources independently. The present invention provides an efficient way to implement this validation.

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

List of Reference Symbols
100 first embodiment of resource management system
102 licensor
104 product
106 licensee
108 first communication channel
110 second communication channel
112 third communication channel
200 second embodiment of resource management system
202 service operator
204 fourth communication channel
206 fifth communication channel
300 third embodiment of resource management system
302 handset manufacturer
304 mobile network operator
306 sixth communication channel
308 seventh communication channel
310 eighth communication channel

The invention claimed is:

1. A resource management system for managing configurable resources of a secure element, the resource management system comprising a licensor, a licensee and the secure element, wherein:
the licensor stores a license and first key in the secure element and transmits the license to the licensee;
the licensor generates a second key by applying a derivation function to the license using the first key;
the licensor transmits the second key to the licensee;
the licensee generates a configuration request comprising the license and license usage instructions;
the licensee applies a protection function to at least part of the configuration request using the second key;
the licensee transmits the configuration request to the secure element after applying the protection function to the at least part of the configuration;
the secure element is configured to generate a validation key by applying said derivation function to the license using the first key; and
the secure element is further configured to validate the received configuration request by applying said protection function to the at least part of the configuration request using the validation key and by comparing the result thereof with the result of the protection function applied by the licensee and the secure element configures its resources in accordance with the license usage instructions if the compared results are the same.

2. A resource management system as claimed in claim 1, wherein the license and the license usage instructions comprise a byte string.

3. A resource management system as claimed in claim 1, wherein the configuration request comprises optional other information.

4. A resource management system as claimed in claim 1, wherein the protection function applied by the licensee and the secure element comprises the generation of a Message Authentication Code computed over the license and the license usage instructions using the second key and the validation key, respectively.

5. A resource management system as claimed in claim 1, wherein the protection function applied by the licensee comprises a symmetric encryption algorithm applied to the license and license usage instruction using the second key, and the protection function applied by the secure element comprises a corresponding decryption algorithm using the validation key.

6. A resource management system as claimed in claim 1, wherein the licensee is further arranged to transmit the configuration request to the secure element via a service operator;
wherein the service operator is arranged to append a keyset to the configuration request;
wherein the secure element is further arranged to grant access to its resources only if the configuration request comprises said keyset.

7. A resource management system as claimed in claim 6, wherein the secure element is further arranged to generate said keyset and to transmit said keyset to the service operator.

8. A resource management system as claimed in claim 1, wherein the secure element is embedded in a mobile device.

9. A method for managing configurable resources of a secure element in a resource management system, the resource management system comprising a licensor, a licensee and the secure element, wherein
the licensor stores a license and a first key in the secure element and transmits the license to the licensee;
the licensor further generates a second key by applying a derivation function to the license using the first key;
the licensor further transmits the second key to the licensee;
the licensee generates a configuration request comprising the license and license usage instructions;
the licensee applies a protection function to at least part of the configuration request using the second key;
the licensee further transmits the configuration request to the secure element after applying the protection function to the at least part of the configuration request;
the secure element generates a validation key by applying said derivation function to the license using the first key; and
the secure element validates the received configuration request by applying the protection function to the at least part of the configuration request using the validation key and by comparing the result thereof with the result of the protection function applied by the licensee and the secure element configures its resources in accordance with the license usage instructions if the compared results are the same.

* * * * *